O. H. ESCHHOLZ.
ALTERNATING CURRENT WELDING SYSTEM.
APPLICATION FILED JUNE 25, 1919.
1,365,311.
Patented Jan. 11, 1921.
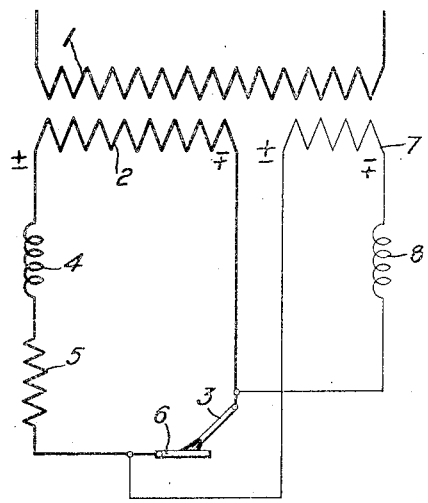
WITNESSES:
H. T. Shelhamer
O. E. Bee.
INVENTOR
Otto H. Eschholz
BY
Wesley G. Carr
ATTORNEY

UNITED STATES PATENT OFFICE.

OTTO H. ESCHHOLZ, OF WILKINSBURG, PENNSYLVANIA, ASSIGNOR TO WESTINGHOUSE ELECTRIC & MANUFACTURING COMPANY, A CORPORATION OF PENNSYLVANIA.

ALTERNATING-CURRENT WELDING SYSTEM.

1,365,311.   Specification of Letters Patent.   Patented Jan. 11, 1921.

Application filed June 25, 1919. Serial No. 306,520.

*To all whom it may concern:*

Be it known that I, OTTO H. ESCHHOLZ, a citizen of the United States, and a resident of Wilkinsburg, in the county of Allegheny and State of Pennsylvania, have invented a new and useful Improvement in Alternating-Current Welding Systems, of which the following is a specification.

My invention relates to electric arc welding systems and more particularly to such systems employing alternating current. The primary object of my invention is to provide a system which shall facilitate welding by means of alternating current and, at the same time, insure satisfactory results.

While it has been found practicable to maintain a welding arc by means of a 110-volt, 60-cycle alternating current, when employing a series ballast resistance of reactance, difficulty has been encountered in starting the arc unless a high arc current was utilized. A high arc current is necessary in establishing an arc on account of the fact that the work must be materially heated before an arc can be drawn. A suitable current value for starting the arc, if maintained, would result in an excessive rate of deposition of metal or melting through the parent metal of the scarf. In view of this, one object of my invention is to provide a welding system in which a suitable starting current may be employed and a desirable operating current automatically established after an arc has been drawn.

A still further object of my invention is to provide an arc welding system in which a high starting current value may be obtained and a subsequent desirable operating current value be automatically established without the employment, and consequent complication, of movable parts.

With these and other objects in view, my invention will be more fully described, illustrated in the drawing, in which corresponding numerals indicate like parts, and then particularly pointed out in the claims.

In the single figure of the drawing, an arc welding circuit is diagrammatically shown which embodies my invention.

In practising my invention I may employ a welding system, such as shown in the drawing, comprising a primary winding 1, which may be connected to a suitable source of alternating current, (not shown) and a secondary winding 2 which is, of course, inductively related to the primary winding. One side of the winding 2 may be connected to a welding electrode 3 and the other side may be connected, through an inductance 4 and a resistance 5, to another electrode 6. I may employ an additional winding 7 which is also inductively related to the primary winding 1 and which may be connected, at one side, to the electrode 6 and, at its other side, through an inductance 8, to the other electrode 3.

In operation, the above described welding system may be energized by connecting the primary winding 1 to a suitable source of alternating-current supply. The secondary winding 2 will, therefore, be energized, and, when the electrodes 3 and 6 are engaged, a current will flow through the circuit thus established, the main welding circuit comprising the secondary winding 2, the inductance 4, the resistance 5, and the electrodes 3 and 6. When the electrodes are engaged and then slowly drawn apart, an arc may be drawn in the ordinary manner. However, when the electrodes engage, a low-resistance path is provided through which the additional winding 7 tends to send a relatively heavy current. The current thus supplied may be of any desired value according to the design of the winding 7. Furthermore, the coil 7 is so connected that the current supplied by it to the main welding circuit will add to the current in the main welding circuit and thus greatly increase the starting current.

The value of the current passing through the additional coil 7, under both open-circuit and closed-circuit conditions, may be so regulated by the design of the coil as to greatly facilitate starting the arc. The impedance in the main welding circuit, represented by the inductance 4 and the resistance 5, is employed to stabilize the arc and facilitate holding a steady arc under operating conditions. The inductance 8, in series with the additional coil 7, also acts as a stabilizing means and limits the flow of current. The voltage maintained between the electrodes, under open-circuit conditions, may range from 100 volts to 130 volts and, when an arc is burning, the voltage drop is between 15 and 20 volts.

The value of employing means for increasing the value of the starting current is materially greater when utilizing welding currents of relatively small value, as such currents do not heat the work quickly, and, consequently, cause starting difficulties. It will be appreciated that, by employing an additional winding to increase the short-circuit value of current in the welding system, the operation of starting an arc is greatly facilitated and this result is accomplished by employing a simple system which is not subject to disorders encountered in apparatus having relatively movable parts. The system above described would ordinarily be designed to effect a 50% increase in the value of the current during the starting period or when the electrodes are engaged.

Although I have specifically described a welding system which may be employed in accordance with my invention, it is obvious that minor changes may be made in the arrangement and construction thereof and I desire, therefore, that no limitations shall be imposed except such as are indicated in the appended claims.

I claim as my invention:—

1. An arc welding system comprising a primary winding, a secondary winding, a plurality of electrodes connected to the secondary winding, and an additional winding inductively related to the primary winding connected in parallel relation to the electrodes.

2. An arc welding system comprising a primary winding, a secondary winding, an impedance connected to said secondary winding, a pluralitiy of electrodes connected to the secondary winding and in series with the impedance, and an additional winding inductively related to the primary winding connected to the electrodes.

3. An arc welding system comprising a primary winding, a secondary winding, an impedance connected to said secondary winding, a plurality of electrodes connected to the secondary winding and in series with the impedance, an additional winding inductively related to the primary winding connected to the electrodes, and an impedance connected in series with the additional winding and the electrodes.

In testimony whereof, I have hereunto subscribed my name this 19th day of June 1919.

OTTO H. ESCHHOLZ.